US006336126B1

(12) United States Patent
Bjorklund et al.

(10) Patent No.: US 6,336,126 B1
(45) Date of Patent: *Jan. 1, 2002

(54) WEARABLE COMPUTER

(75) Inventors: Ronald Einar Bjorklund, Bahama; Robert Thomas Cato, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,125

(22) Filed: Oct. 5, 1999

Related U.S. Application Data

(63) Continuation of application No. 08/653,217, filed on May 24, 1996, now Pat. No. 6,047,301.

(51) Int. Cl.[7] .............................. G06F 3/00; G06F 1/16; H05K 5/00; H05K 5/04
(52) U.S. Cl. ........................ 708/139; 361/681; 361/686; 361/730; 345/30; 359/154
(58) Field of Search ................. 708/139; 361/681–686; 358/310; 359/152, 176

(56) References Cited

U.S. PATENT DOCUMENTS

| | | | | |
|---|---|---|---|---|
| 5,241,410 A | * | 8/1993 | Streck | 359/176 |
| 5,491,651 A | * | 2/1996 | Janik | 361/683 |
| 5,600,470 A | * | 2/1997 | Walsh | 359/152 |

* cited by examiner

Primary Examiner—Emmanuel L. Moise
(74) Attorney, Agent, or Firm—Winstead, Sechrest & Minick; J. Bruce Schelkopf; John D. Flynn

(57) ABSTRACT

A wearable computer communicates with its display device via an optical link. The optical link may utilize different colored LEDs and corresponding photodetectors for transmitting and receiving the video and control signals to and from the computer and the hand-held display package. The wearable computer may communicate with a local area network by a radio communications link. The use of two antennas mounted and associated with the wearable computer eliminates any notch within a propagation pattern emanated from the antennas.

14 Claims, 9 Drawing Sheets

FIG. 12
FIG. 13
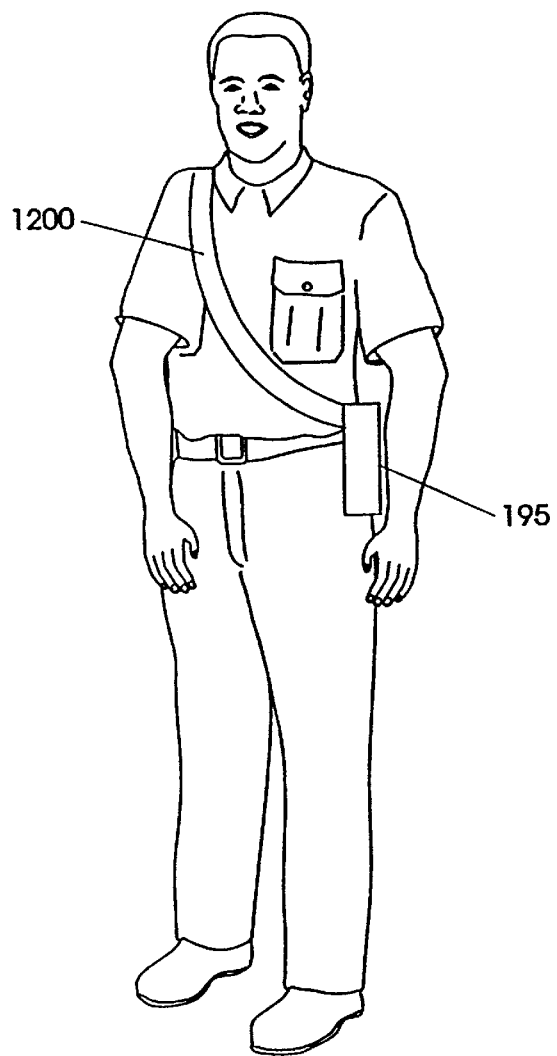
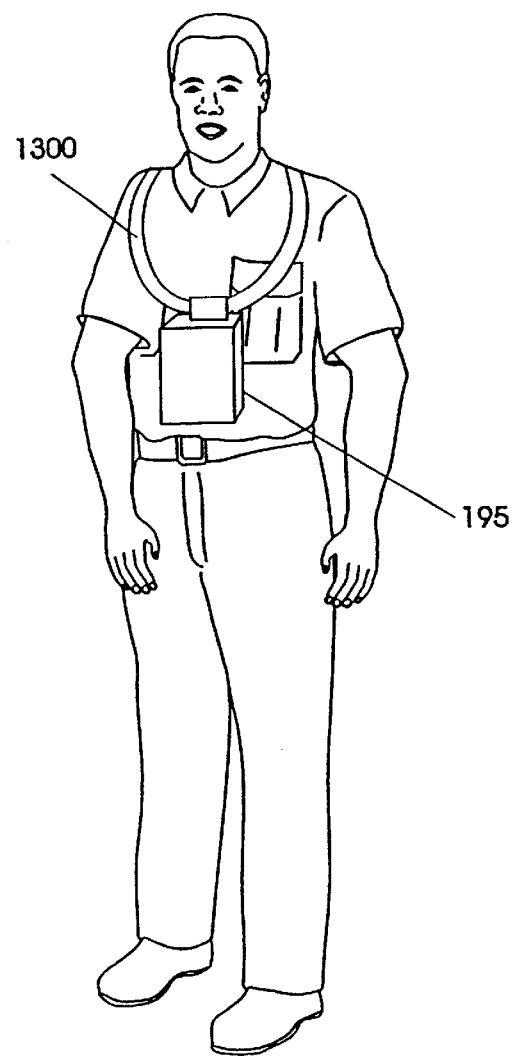

WEARABLE COMPUTER

This application is a continuation of U.S. application Ser. No. 08/653,217, now U.S. Pat. No. 6,047,301.

TECHNICAL FIELD

The present invention relates in general to data processing systems, and in particular, to a wearable computer with a hand-held display device.

BACKGROUND INFORMATION

In recent years, because of the fast development in electronic technology, computers have become faster in operation and more compact in structure. Because they are high performance, low cost and easy to carry, portable and hand-held personal computers have become more and more popular.

Typical hand-held computers that are rich in function and long in battery life are cumbersome and heavy. Functions such as bar code scanners, hard files, batteries, wireless LAN (local area network) adapters, etc. take up space and have considerable weight. This makes long-term use of these devices tiring to the user.

Thus, there is a need in the art for a hand-held computer that is more lightweight for the user to hold for long periods of time.

SUMMARY OF THE INVENTION

The present invention satisfies the foregoing need by mounting the processor, hard files, adapter cards, antenna, batteries, and all other computer-associated components, except for the display, which could include touch, pen or voice input, on a user's belt, backpack, or any other wearable accessory. The display and touch screen can be packaged in a separate ultra-lightweight unit that the operator can hold. Communication between the wearable computer and the hand-held display may be achieved by a wireless link, such as a four-color optical link.

The present invention can also be used within a wireless network (LAN or WAN (wide area network)) by providing for wireless radio (RF) communications between the wearable computer and a computer server also employing RF communications equipment. The use of two patch antennas mounted on opposite sides of the person's body eliminates any gaps in the propagation pattern emanated from the transceiver coupled to the wearable computer.

When not in use, the hand-held display package can be mounted to the wearable computer for storage. Additionally, with such a storage configuration, electrical terminals can be provided so that a larger power supply associated with the wearable computer can charge a smaller battery pack powering the hand-held display package.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof reference is now made to the following descriptions taken in conjunction with the accompanying drawings in which:

FIG. 12 illustrates use of an over-the-shoulder strap to carry the present invention; and FIG. 13 illustrates use of a neck strap to carry the present invention.

DETAILED DESCRIPTION

Figure 1:
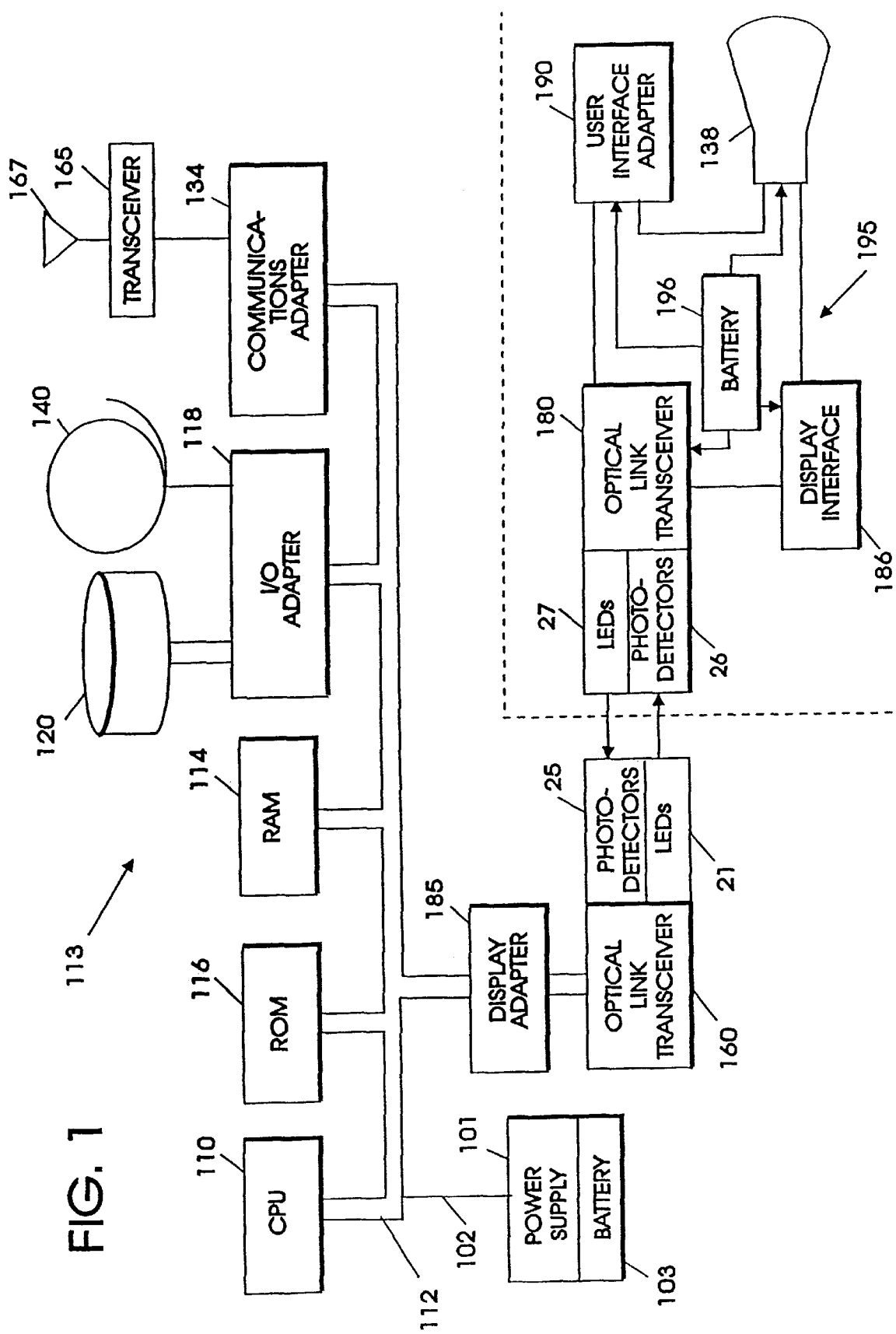
FIG. 1 illustrates in block diagram form, an embodiment of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
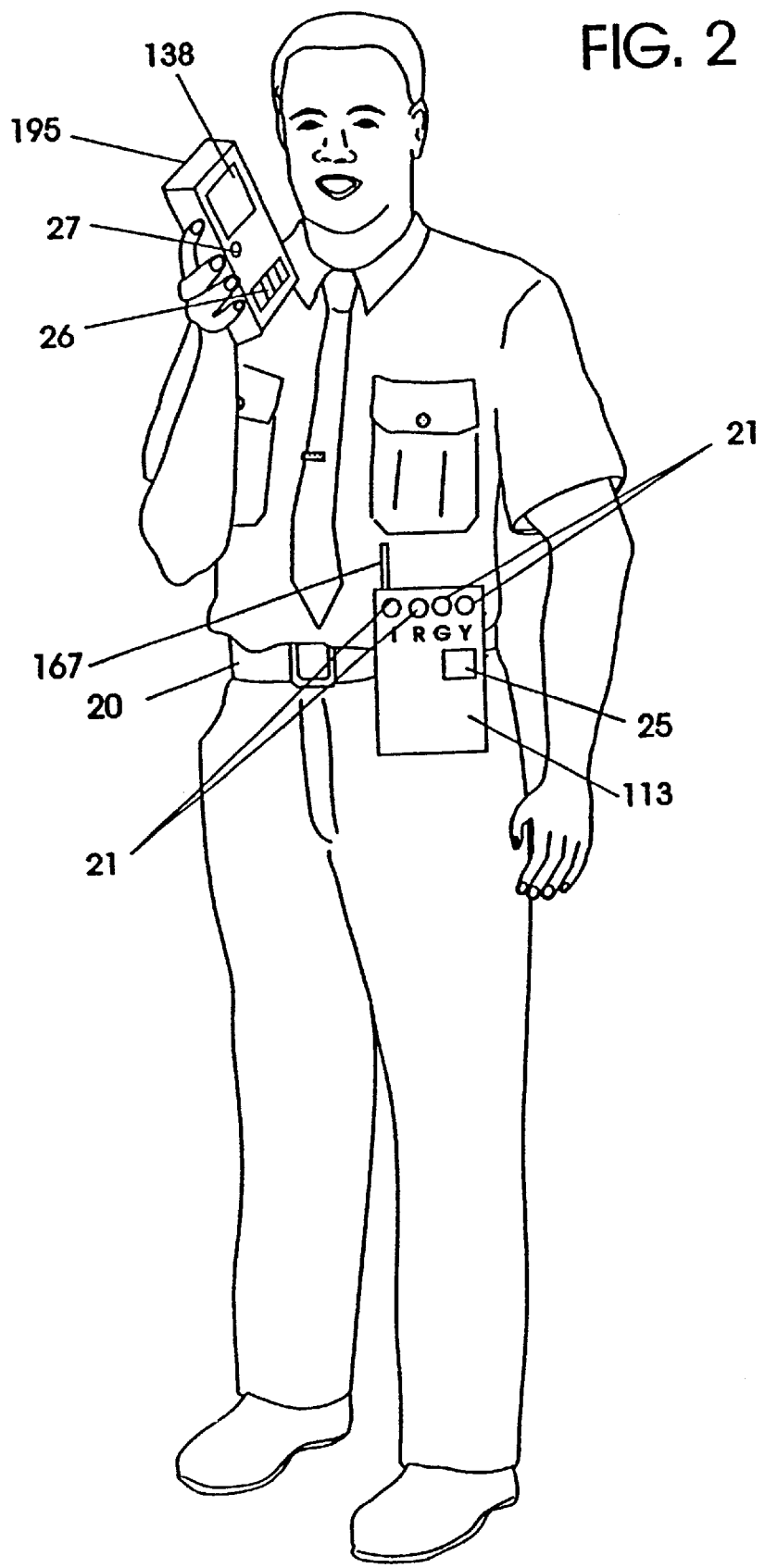
FIG. 2 illustrates a user holding an embodiment of the present invention.

Referring to FIG. 2, there is illustrated a user holding an embodiment of the present invention. Wearable unit 113 of the computer, which may include the central processing unit (CPU), memory and storage devices, adapter cards, communications antenna, power supply/batteries, display adapter, and other computer-associated components, except for the display and touch screen, are mounted on belt 20 attached to the user. Display circuitry and touch screen 138 are mounted within display package 195, which is shown being held by the user.

Also shown is antenna 167 coupled to wearable unit 113, which, as described further below, is adaptable for permitting wireless communications between the wearable computer and a wireless network or other communications link.

In the embodiment shown in FIG. 2, a special high-speed optical link allows unit 113 to communicate wirelessly with display package 195. The distance between unit 113 and display package 195 can be at an arm's length, so it will be possible to achieve data rates necessary to control display device 138, such as a flat panel display device, e.g., a liquid crystal color VGA screen, a field emission display (FED), a plasma screen, etc. A battery (not shown) is used within display package 195 to provide power to the display circuitry.

Referring next to FIG. 1, there is shown a block diagram of the wearable computer illustrated in FIG. 2. Unit 113 comprises CPU 110 coupled by system bus 112 to read only memory (ROM) 116, random access memory (RAM) 114, input/output (I/O) adapter 118, communications adapter 134, and display adapter 185.

I/O adapter 118 couples bus 112 to such storage devices as hard disk or optical disk 120, and tape storage 140.

Communications adapter 134, is coupled to transceiver 165. Transceiver 165 is operable for transmitting and receiving RF radio signals via antenna 167 to a corresponding transceiver and antenna associated with a network server (not shown), as discussed below with respect to FIG. 3. Alternatively, an optical or other wireless link, or a wired link may also be used for communications with the network server.

Power is supplied to unit 113 by power supply 101, which may utilize some type of battery 103. Power from battery 103 is supplied via link 102, which may be a part of bus 112.

Display package 195 incudes optical link transceiver 180 coupled to display interface 186 and user interface adapter 190. User interface adapter 190 and display interface 186 are coupled to display screen 138, which may be a touch screen operable for permitting input to the computer by a user. To facilitate such a touch screen, user interface adapter 190 may include a touch controller.

Battery 196 coupled to each of the aforementioned portions of display package 195 supplies power to these portions. Battery 196 may be smaller than battery 101 to maintain the lightweight characteristic of display package 195.

Communications between display package 195 and unit 113 is performed via optical link circuitry.

Optical link transceiver 180 may include one or more light emitting diodes ("LEDs") 27 for converting electrical signals into optical signals to be transmitted for detection by one or more photodetectors 25 coupled to optical link transceiver 160. Likewise, optical link transceiver 160 may include one or more LEDs 21 operable for converting electrical signals carrying video and control information for transmission and reception by one or more photodetectors 26 coupled to optical link transceiver 180. Alternatively, solid state lasers could be used instead of LEDs. Photodetectors 25 and 26 operate to convert the received optical signals into electrical signals carrying video and/or control information.

Figure 10:
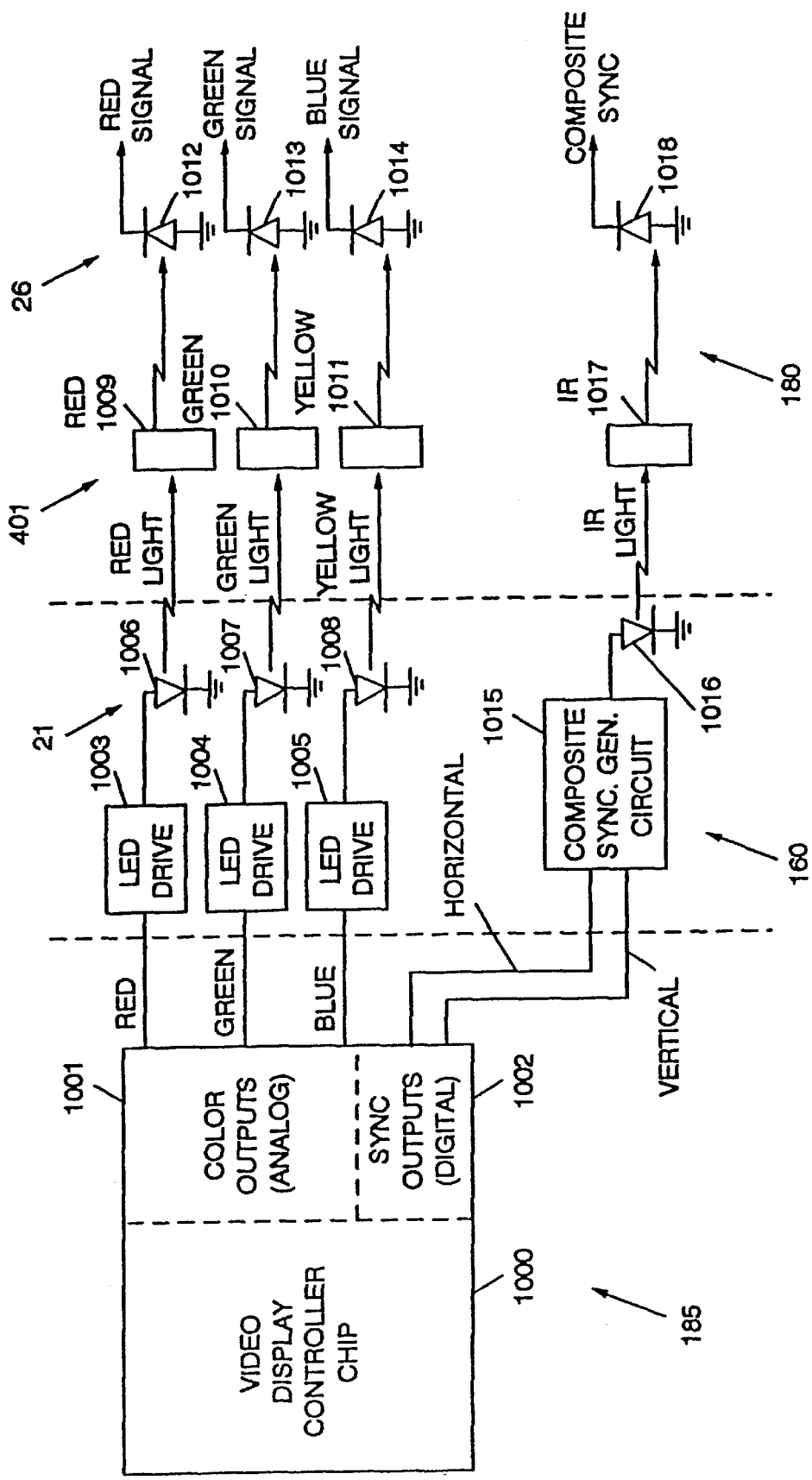
FIG. 10 illustrates in partial block diagram form and partial circuit diagram form an optical link in accordance with one embodiment of the present invention.

Referring next to FIG. 10, there is shown one embodiment for the optical link circuitry. Standard video display controller chip 1000 can be used to drive display 138: red, green, blue, horizontal sync (H sync) and vertical sync (V sync). Such chips output digital sync pulses, but the color signals are analog.

Video display controller chip 1000 includes circuitry 1001 for outputting the red, green and blue analog signals and circuitry 1002 for outputting the digital horizontal and vertical sync signals. Video display controller chip 1000 may be a portion of display adapter 185.

FIG. 10 also illustrates a portion of optical link transceiver 160 for converting the color and sync outputs from circuits 1001 and 1002, respectively, into optical signals to be transmitted to optical link transceiver 180, a portion of which is also illustrated in FIG. 10.

The red, green and blue color signals are received by LED drive circuits 1003–1005, respectively, which drive LEDs 21 comprised of LED 1006 for transmitting the red color signal via a red light. LED 1007 for transmitting the green color signal using a green light, and LED 1008 for transmitting the blue color signal using a yellow light.

Receipt of such optical signals from red, green, and yellow diodes 21 is done by corresponding photodetectors 26 in display package 195.

It is possible to create a composite sync signal that contains both horizontal and vertical sync information. This may be performed by using composite sync generating circuit 1015 and driving LED 1016 to transmit the information using infrared (I) light. Thus, four different color LEDs 21 could be used to transmit the video signals from unit 113 to four photodetectors 26 in display package 195. Interference-type filters 401 can be placed in front of each of photodetector 26 to insure that the red signal is only received by the photodetector designated for the red signal, etc. Thus, the red light from LED 1006 is passed through red interference filter 1009 and received by photodetector 1012 to reproduce the red color signal. The green light from LED 1007 is passed through green interference filter 1010 and received by photodetector 1013 to reproduce the green color signal. And, the yellow light is received from LED 1008 and passed through yellow interference filter 1011 to be received by photodetector 1014 to reproduce the blue color signal. Likewise, the infrared light signal received from LED 1016 is passed through infrared interference filter 1017 to be received by photodetector 1018 to reproduce the composite sync signal.

Such interference filters 401 are available from Mellis Griot, Inc., with wavelength bandpasses that cut off within ten nanometers. This is more than adequate for isolating red from green from yellow from infrared LED light. Alternatively, other light wavelength selective filters could be used.

The amplitude of the digital signal from composite sync generating circuit 1015 is not important (within a reasonable range), so this signal can drive infrared LED 1016 directly, without gain control. LEDs 1006–1008 transmitting the color signals may be operated in a linear mode so that the analog signals could be transmitted. Colored LEDs are commercially available with adequate bandwidth, but the end-to-end gain may be controlled, as further described below with respect to FIG. 4.

Non-video data could be included in the communications between unit 113 and display package 195. This data could be placed in the sync signal during the "vertical interval" time. The vertical interval time is when display 138 is normally moving the electron beam back to the starting corner of display 138. This technique is used in TV signals to enable information such as written captions to be transmitted with the normal signal. The information could be such things as diagnostic commands, scanner control, and optical link gain control for analog signals.

Referring back to FIG. 1, display package-to-wearable unit data could be sent via a fifth optical link, pointed in the opposite direction. This link could use any color light for LED 27 since its light source will not be seen by optical detectors 26. Reception of light from LED 27 is performed by photodetector(s) 25.

The circuitry described above with respect to FIG. 10 may also be used for implementing the optical link from LEDs 27 to photodetectors 25.

Figure 4:
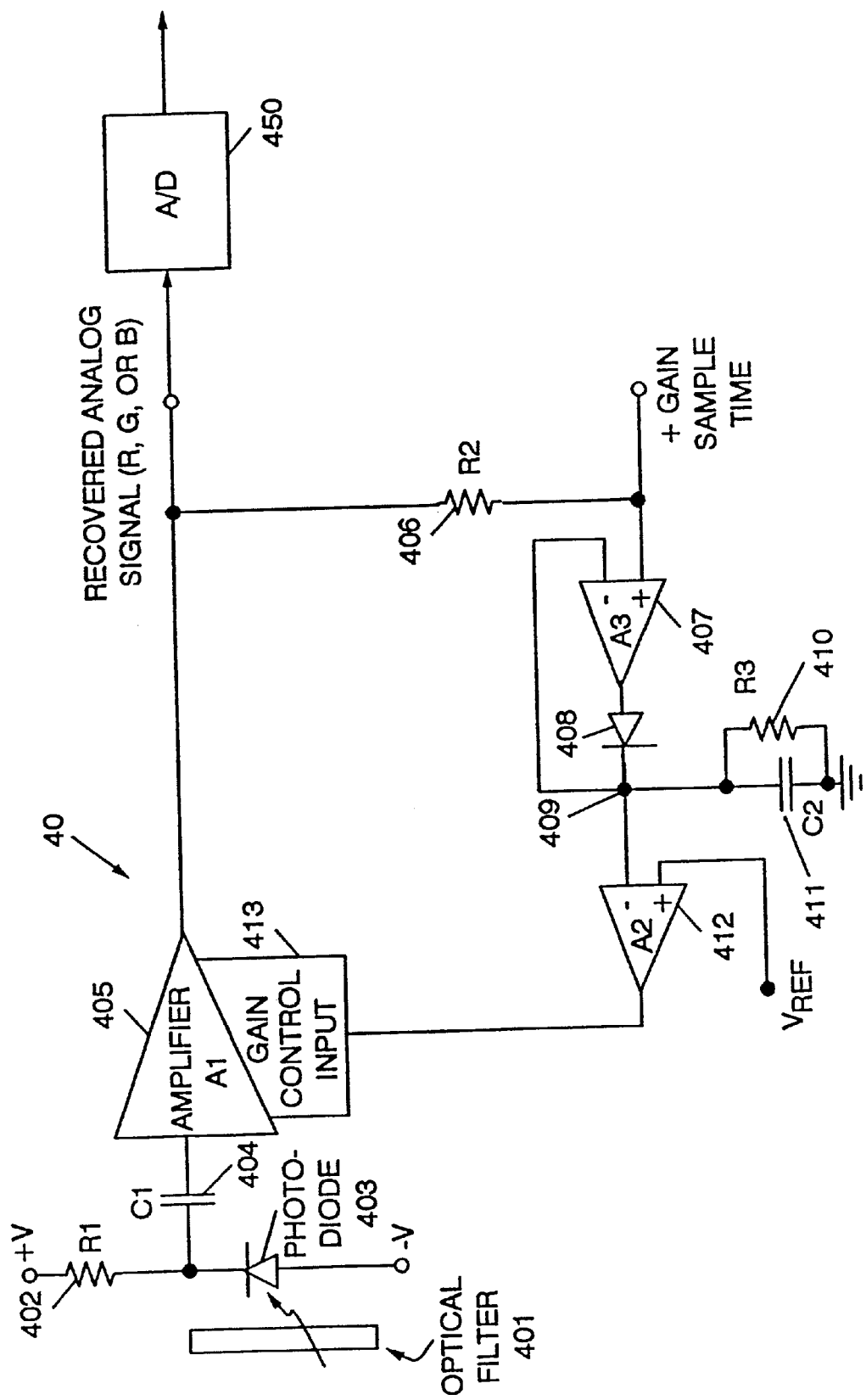
FIG. 4 illustrates a circuit diagram of a photodetector-amplifier-gain control circuit used in the present invention.

Referring next to FIG. 4, there is shown photodetector/amplifier/gain control circuit 40 utilized with respect to each of photodetectors 25 and 26. Since the red, green and blue video signals are analog signals, the end-to-end gain of the optical link must be monitored and controlled. This is especially true since display package 195 will move in relation to wearable computer 113.

Gain control can be achieved by placing a gain calibration pulse on the analog video signals during the vertical interval time. Each of the red, green and yellow light source LEDs would be pulsed at a level that should represent a predefined voltage at the end of the photodetector amplifier chain. Since this is done during the vertical interval time, the displayed information will not be affected. A gain setting sync pulse would be placed on the digital composite sync signal to indicate when the analog signal should be sampled by gain control circuitry 40 associated with each of photodetectors 26. This signal would be recovered by gain control circuitry 40 and labeled "+gain sample time" with it being an open collector driver that is turned off when the gain signal is to be sampled.

Gain control circuitry 40 then samples the recovered analog signals during the indicated sample time within every vertical interval, which is at 60 times a second or greater. This is frequent enough to compensate for movement of display package 195 relative to unit 113 when the user is holding display package 195.

There would be three of circuits 40, one for red, one for green, and one for blue (yellow). The incoming analog optical color signal (red, green or yellow) is first filtered by an optical filter 401 to ensure that only the desired signal is received. The optical signal is then converted to an electrical signal by photodiode 403. The electrical signal is then amplified by amplifier 405, whose gain can be externally controlled by means of an analog signal through gain control input 413. The output of amplifier 405 is the recovered analog color signal.

The recovered analog color signal is then sampled via resistor 406 by a peak follower circuit if the signal (+gain sample time) is not held down by its open collector driver. The peak follower circuit, made up of amplifier 407, diode 408, and capacitor 411 will store the maximum level of the recovered analog signal during the sample time. The time constant of capacitor 411 and resistor 410 is such that the voltage on capacitor 411 is relatively stable during the time between gain samples.

Error amplifier 412 compares the actual signal size stored on capacitor 411 with a reference voltage Vref and provides an error signal. The error signal will be larger if the gain needs to increase. The error signal is then what controls the gain of amplifier 405 via gain control input 413.

The recovered analog color signals are then digitized by analog-to-digital (A/D) converters 450. The digital color signals would then be used to control display 138.

Figure 3:
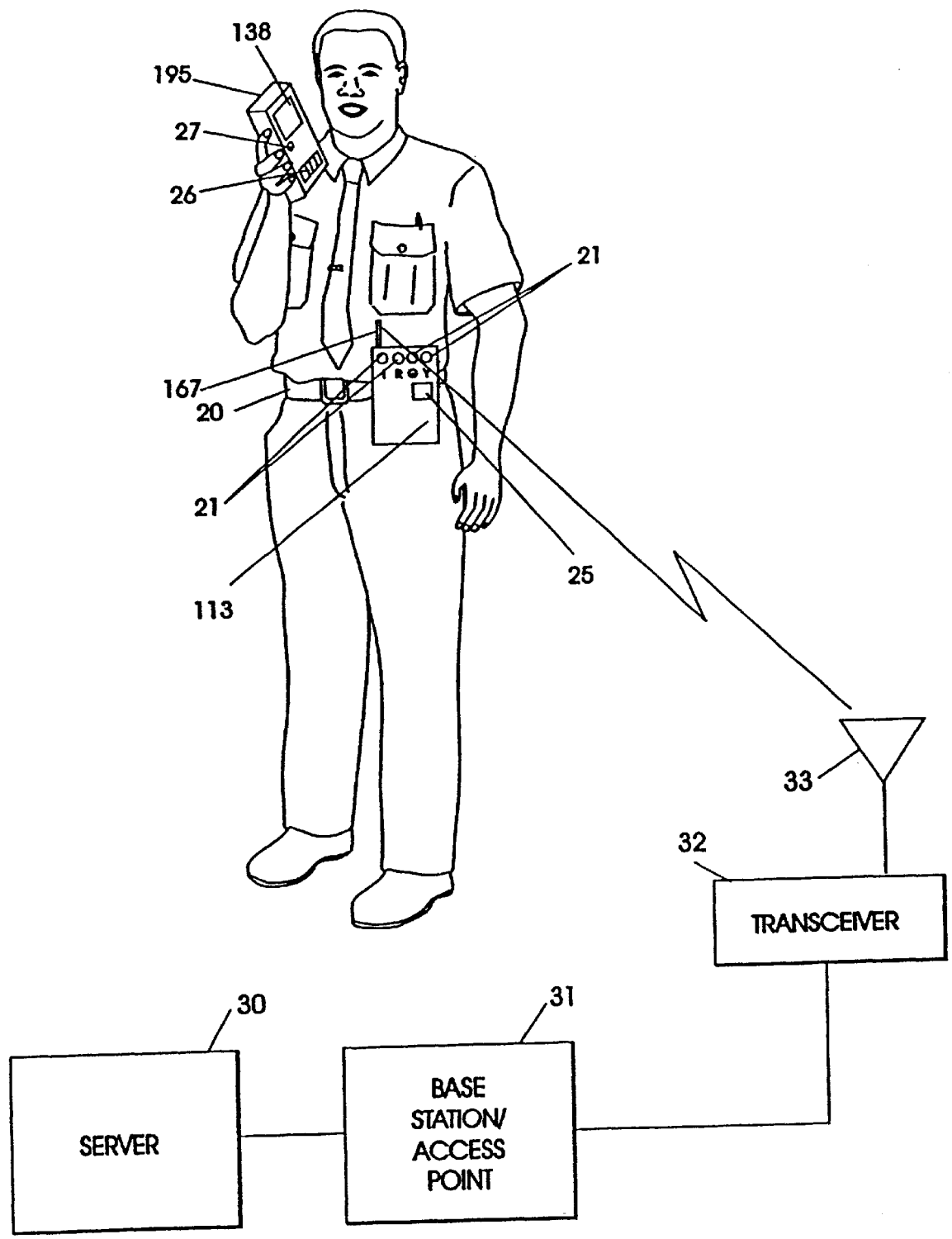
FIG. 3 illustrates use of the present invention within a LAN.
Figure 7:
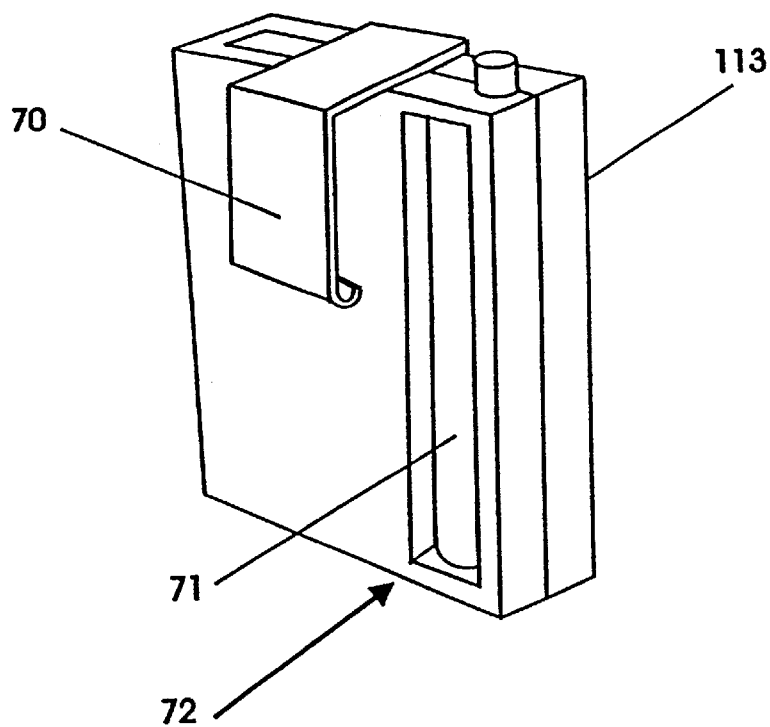
FIG. 7 illustrates a belt clip for mounting the present invention on a belt.

Referring next to FIGS. 3 and 7, there is illustrated use of the present invention within a local area network (LAN). Data is transmitted between wearable computer 113 (which, in FIG. 3 is shown to be mounted to belt 20) via antenna 167 and transceiver 165 to/from antenna 33 and transceiver 32, which is connected to base station/access point 31. Base station/access point 31 communicates these data communications to computer server 30.

Figure 5:
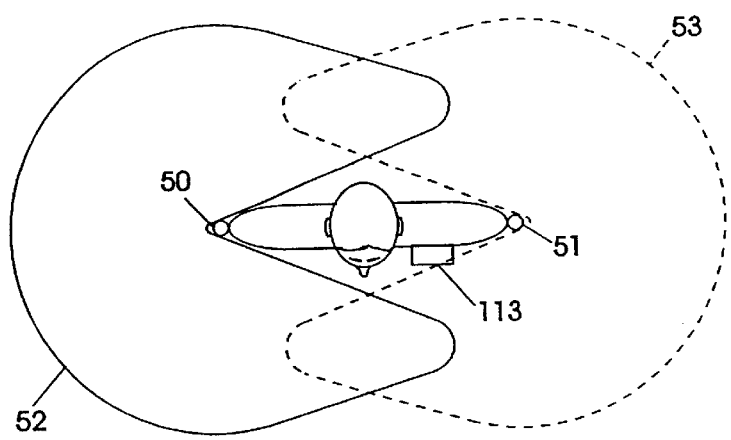
FIG. 5 illustrates propagation patterns of the use of two antennas in conjunction with the present invention.
Figure 6:
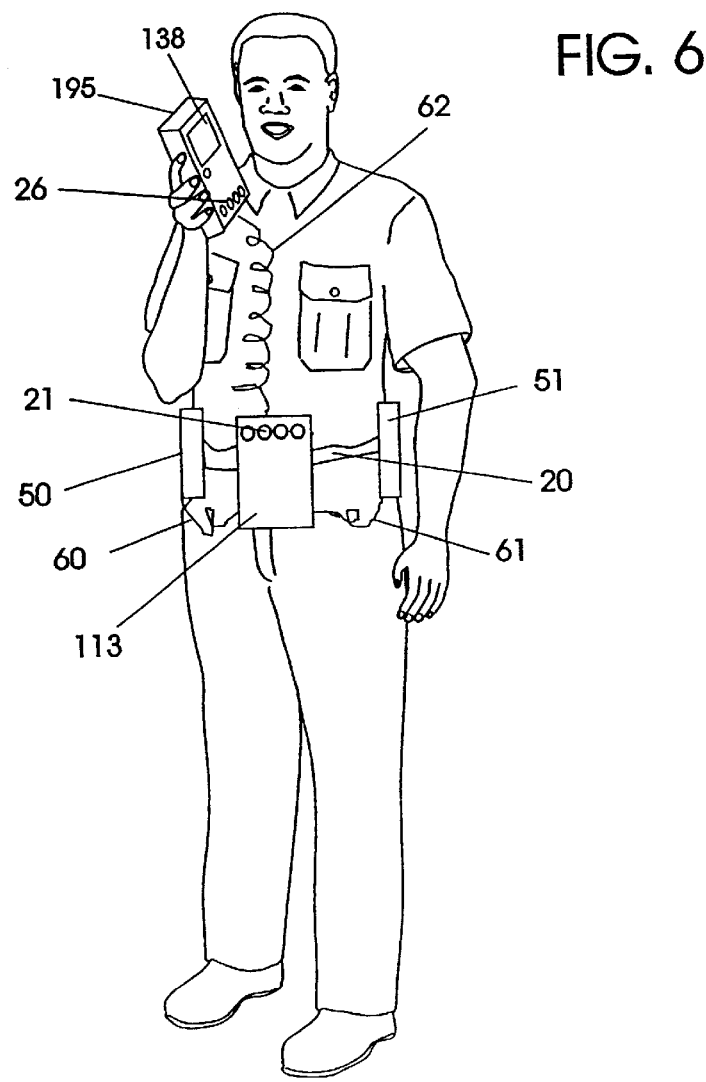
FIG. 6 further illustrates the two antenna embodiment illustrated in FIG. 5.

Referring next to FIGS. 5 and 6 there is illustrated an alternative embodiment of the present invention.

When one antenna 167 is used for communicating with antenna 33 illustrated in FIG. 3, there is the possibility that the user may be positioned so that there is a notch in the propagation pattern emanating from antenna 167 as a result of the user's body blocking the path between antennas 167 and 33. A solution to this problem is the use of two antennas 50 and 51. Patch type antennas would be good for this. Generally, such antennas are directional, flat antennas having an approximate 180 degrees RF pattern. It is not unusual for wireless LAN systems to have the capability for antenna diversity. i.e., the ability to utilize two antennas. Antennas 50 and 51 are coupled to wearable computer 113 via transmission lines 60 and 61. Antennas 50 and 51 may be positioned on belt 20 on opposite sides of the user (or some other location on the user) so that the propagation patterns 52 and 53 overlap resulting in the absence of any notch within the propagation pattern emanating from the antennas 50 and 51.

Note, FIG. 6 illustrates that the use of two antennas 50 and 51 may be used within such a wearable computer where display package 195 is coupled to unit 113 by tethered line 62 transmitting the power and data signals to and from unit 113 and display package 195, instead of the previously described optical method. Alternatively, tethered line 62 could be a fiber optic cable.

Referring next to FIG. 7, there is illustrated a rear view of unit 113 having belt clip 70 attached thereto so that unit 113 can be attached to belt 20.

Also shown is inboard antenna 71 mounted within recess 72 of unit 113, as opposed to the extension of antenna 167 shown in FIG. 3.

Figure 8:
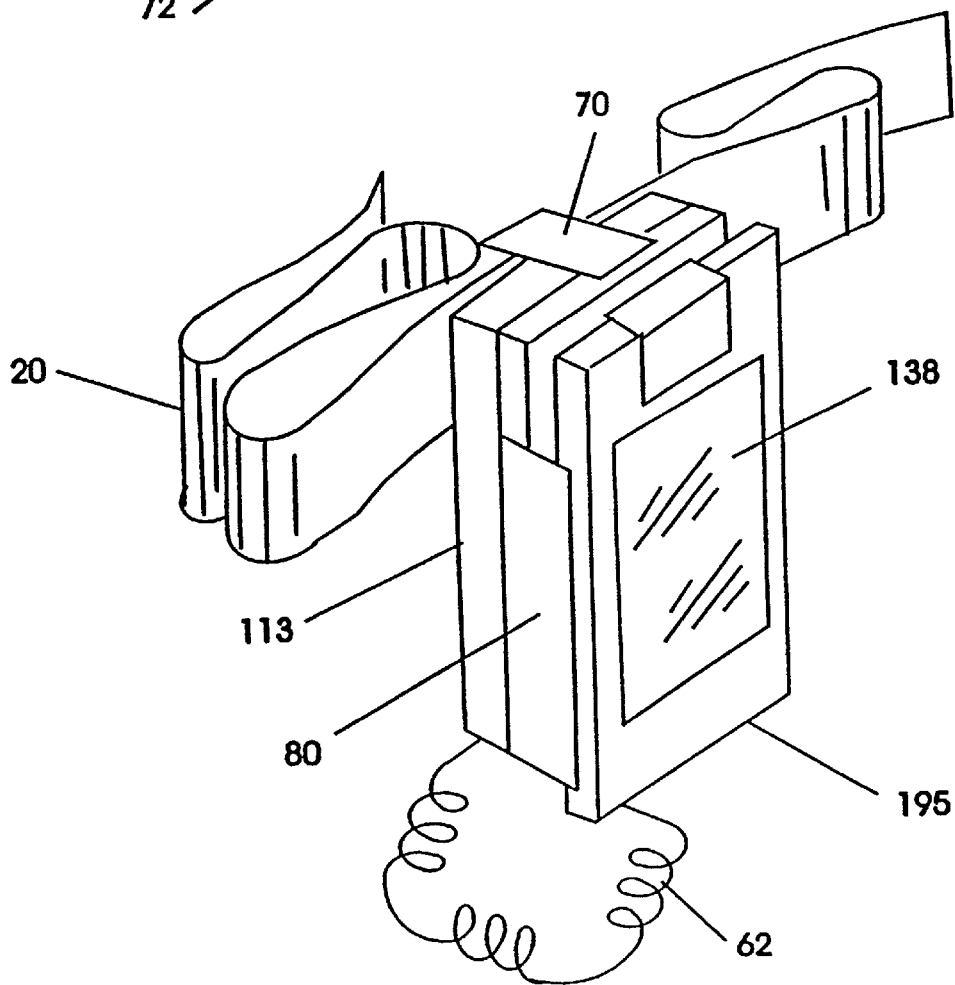
FIG. 8 illustrates the mounting of the display unit with the main computer unit.

Referring next to FIG. 8, there is illustrated the mounting of display package 195 onto wearable computer 113 through the use of clip 80, adaptable for attaching and holding display package 195. Such clips 80 for attaching two devices together are well-known in the art.

Figure 9:
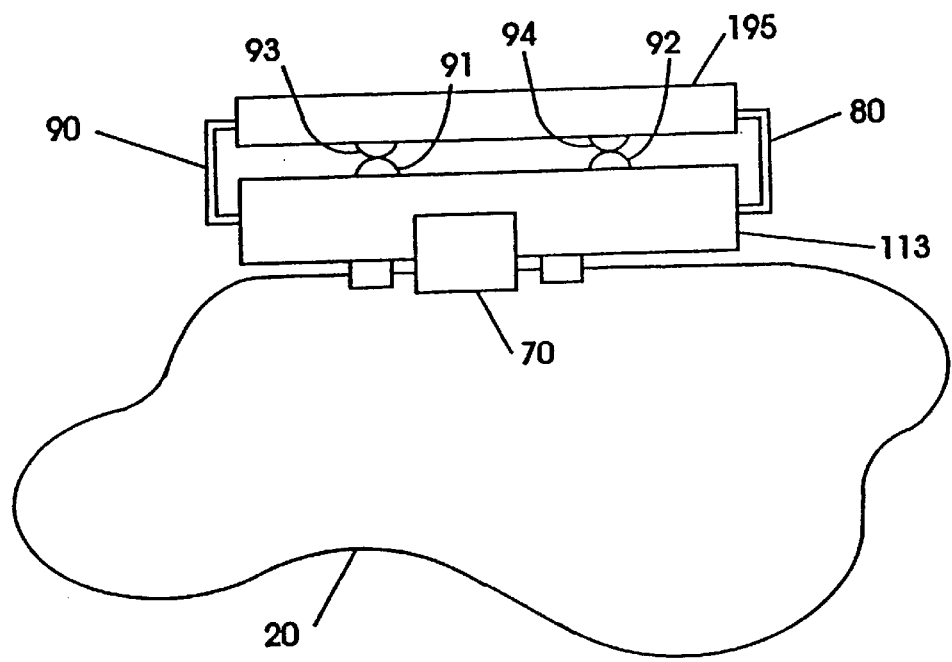
FIG. 9 illustrates an apparatus for recharging batteries within the display unit.

Referring next to FIG. 9, there is illustrated display package 195 attached to unit 113 by clips 80 and 90. Electrical contacts 91–94 are in physical contact with each other when display package 195 is clipped to unit 113 so that battery 101 within unit 113 may supply power to recharge battery 196 within display package 195.

Figure 11:
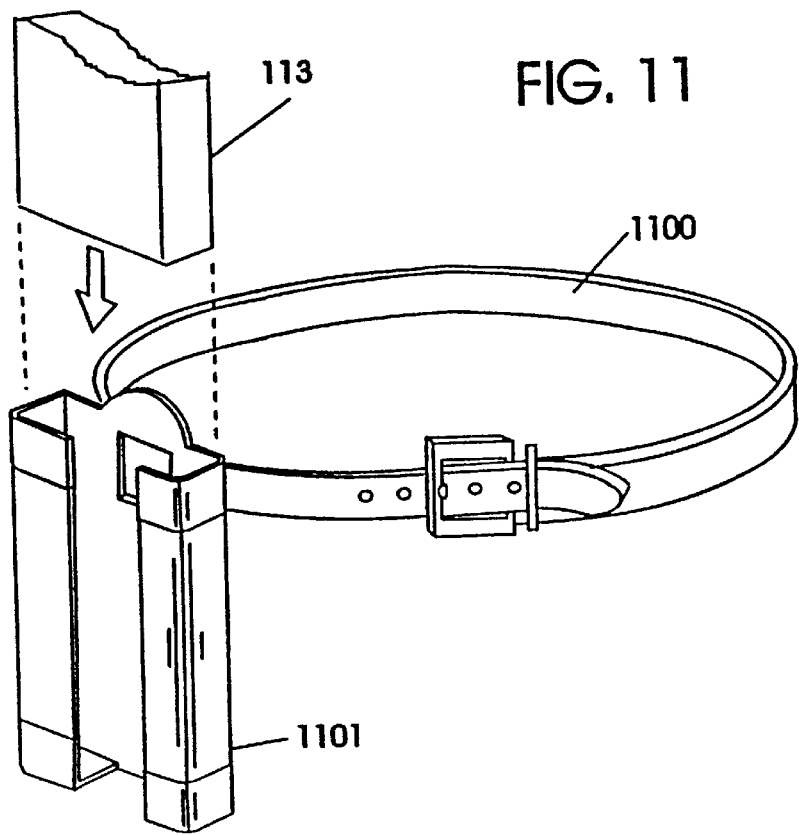
FIG. 11 illustrates use of a holster to carry the present invention.

Referring next to FIG. 11, there is illustrated holster 1101 mounted to belt 1100 for receiving and storing unit 195. Power could be supplied to unit 195 via holster 1101 in a manner similar to that described above with respect to FIG. 9.

Referring next to FIG. 12, there is illustrated unit 113 worn by a user utilizing over-the-shoulder belt 1200.

In FIG. 13, unit 113 is worn by the user utilizing neck strap 1300.

In FIGS. 11–13, display package 195 is not shown for reasons of clarity. Furthermore, unit 113 may be worn by a user in many other fashions, such as with a backpack or some type of head gear.

Though not shown in the figures, unit 113 may be modified by one skilled in the art to include a bar code scanner and/or an RFID tag reader.

Although the present invention and its advantages have been described in detail, it should be understood that various changes, substitutions and alterations can be made herein without departing from the spirit and scope of the invention as defined by the appended claims.

What is claimed is:

1. A data processing system comprising:
   a first unit adaptable for wearing by a user, wherein the first unit includes a processor;
   a second unit physically separate from said first unit, wherein said second unit includes an input or output device; and an optical link for enabling said first unit to communicate with said second unit, wherein said processor is coupled to a first RF transceiver and antenna.

2. The data processing system as recited in claim 1, further comprising:
   a second RF transceiver and antenna operable for communicating with said first RF transceiver; and
   a server computer coupled to said second RF transceiver and antenna, wherein said server computer is capable of communicating with said processor via said first and second RF transceivers and antennas.

3. A data processing system comprising:
   a first unit adaptable for wearing by a user, wherein said first unit includes a processor;
   a second unit physically separate from said first unit, wherein said second unit includes an input or output device;
   an optical link for enabling said first unit to communicate with said second unit; and
   means for physically attaching said second unit to said first unit, wherein the input or output device includes an output display.

4. The data processing system as recited in claim 3, further comprising:
   means for supplying electrical power from said first unit to said second unit when said second unit is physically attached to said first unit.

5. A data processing system comprising:
   a first unit adaptable for wearing by a user, wherein said first unit includes a processor;
   a second unit physically separate from said first unit, wherein said second unit includes an input or output device; and
   an optical link for enabling said first unit to communicate with said second unit, wherein said first unit is mounted in a holster.

6. A wearable computer, comprising:
   a first unit including a processor, wherein said first unit is adaptable for mounting on a user's body; and
   a pair of RF antennas adaptable for mounting on said user's body to provide a 360 degree propagation pattern around said user, said pair of RF antennas coupled to said first unit through a transceiver and operable for permitting said first unit to communicate with another data processing device.

7. The wearable computer as recited in claim 6, further comprising:
   a second unit including a display device, wherein said second unit is adaptable for being hand-held by said user; and
   means for permitting communications between said first and second units.

8. The wearable computer as recited in claim 7, wherein said permitting means comprises:
   a tether wire coupled between said first and second units, said tether wire carrying video, control, and power signals.

9. The wearable computer as recited in claim 7, wherein said permitting means comprises:
   an optical link for enabling said first unit to communicate with said second unit.

10. The wearable computer as recited in claim 9, wherein said optical link comprises:
    a transceiver coupled to said processor;
    one or more LEDs coupled to said transceiver; and
    one or more photodetectors coupled to said display device and operable for receiving signals transmitted from said one or more LEDs, wherein said transceiver and said one or more LEDs are located coextensively with said first unit, and wherein said one or more photodetectors are located coextensively with said second unit.

11. An apparatus for transmitting information optically, said apparatus comprising:
    LED drive circuitry operable for receiving said information;
    one or more LEDs operable for emitting one or more light signals at one or more wavelengths when driven by said LED drive circuitry with one or more signals representing said information; and
    one or more photodetectors operable for receiving said one or more light signals and producing one or more electrical signals as a function of said received one or more light signals,
       wherein the light signals are wirelessly coupled to the LEDs and the photodetectors.

12. An apparatus for transmitting information optically, said apparatus comprising:
    LED drive circuitry operable for receiving said information,
    one or more LEDs operable for emittng one or more light signals at one or more wavelengths when driven by said LED drive circuitry with one or more signals representing said information;
    one or more photodetectors operable for receiving said one or more light signals and producing one or more electrical signals as a function of said received one or more light signals; and
    one or more light wavelength selective filters through which said one or more light signals pass before being received by said one or more photodetectors.

13. An apparatus for transmitting information optically, said apparatus comprising:
    LED drive circuitry operable for receiving said information,
    one or more LEDs operable for emitting one or more light signals at one or more wavelengths when driven by said LED drive circuitry with one or more signals representing said information; and
    one or more photodetectors operable for receiving said one or more light signals and producing one or more electrical signals as a function of said received one or more light signals, wherein said information includes red, green, and blue video color signals.

14. An apparatus for transmitting information optically, said apparatus comprising:
    LED drive circuitry operable for receiving said information;
    one or more LEDs operable for emitting one or more light signals at one or more wavelengths when driven by said LED drive circuitry with one or more signals representing said information; and
    one or more photodetectors operable for receiving said one or more light signals and producing one or more electrical signals as a function of said received one or more light signals, wherein said information includes vertical and horizontal synchronization signals.

* * * * *